United States Patent [19]

Wey et al.

[11] 4,156,833
[45] May 29, 1979

[54] INFORMATION DISPLAY PANEL AND METHOD OF FABRICATION

[75] Inventors: Horng-Yhi Wey, Monroeville; David H. Davies, Wilkins Township, Allegheny County, both of Pa.

[73] Assignee: Westinghouse Electric Corp., Pittsburgh, Pa.

[21] Appl. No.: 800,120

[22] Filed: May 24, 1977

[51] Int. Cl.² .................... H05B 37/00; H05B 39/00; H05B 41/00
[52] U.S. Cl. ............................ 340/719; 340/166 EL; 340/760; 340/781
[58] Field of Search .................... 315/169 R, 169 TV; 340/166 EL; 313/217, 220

[56] References Cited

U.S. PATENT DOCUMENTS 3,996,490  12/1976  Miller ................................. 313/217
4,006,383   2/1977  Luo et al. ...................... 315/169 TV

OTHER PUBLICATIONS

L. A. Scanlon et al., "Human Performance Evaluation of Matrix Displays . . .", Dept. of Commerce, NTIS Report AMRL-TR-76-39; Jun. 1976, pp. 124-129.

Primary Examiner—Alfred E. Smith
Assistant Examiner—Robert E. Wise
Attorney, Agent, or Firm—W. G. Sutcliff

[57] ABSTRACT

A modularized information display panel is formed of identical modules which have thin film transistor control elements disposed at display elements which are in an X-Y array upon the module substrate. The display medium driving electrode portion of the thin film circuit which is associated with each display element is non-symmetrically spaced relative to a unit display element, but the display element electrode is symmetrically positioned relative to the center of symmetry of the individual modules which make up the panel. In this way abutted display modules which form the display panel have display element arrays which are symmetrically aligned in the X-Y directions while the interconnecting X-Y buses of the abutted modules are offset.

9 Claims, 5 Drawing Figures

INFORMATION DISPLAY PANEL AND METHOD OF FABRICATION

BACKGROUND OF THE INVENTION

The present invention relates to solid state display panels. A wide variety of solid state or flat panel display devices have been proposed in recent times including the use of large scale integrated circuitry using silicon chips to actuate and control a liquid crystal display medium, as well as thin film transistorized display panels which drive electroluminescent display medium. An electroluminescent display panel composed of an X-Y array of display elements upon a planar insulating substrate, with integral thin film transistor circuit control elements, is described in U.S. Pat. No. 4,006,383, owned by the assignee of the present invention.

Solid state display panels are desired as a replacement for conventional cathode ray tube display means because of the rugged, compact design of the low power requirements projected for such solid state display devices. A particular application for such flat panel displays is for alphanumeric displays. A competitive alphanumeric display system utilizes a gaseous discharge display panel, and a modularized gas discharge panel is described in U.S. Pat. No. 3,996,490. For alphanumeric display usage the display elements are arrayed in an X-Y array, which typically utilizes a conventional alphanumeric format with five horizontally disposed display elements and seven vertically disposed display elements comprising a single alphanumeric character. A plurality of rows and columns of such 5×7 display alphanumeric characters are arrayed upon the display module or display panel.

In order to reduce the cost of fabrication of such display panels it is desired that the panel be constructed from identical modules which can be abutted together to form the entire display panel. A significant cost saving results from the reduced vacuum system and mask system size requirements, which can be greatly reduced when a relatively small module size compared to the total display size is used. The particular problem to which the present invention is directed is that when using a thin film transistor control circuit as set forth in the above-referred to U.S. Pat. No. 4,006,383, the display medium electrode which occupies a substantial portion of the total layout area of a unit cell is typically not symmetrically disposed within the unit display cell. The unit display cell is defined typically by the intersection of the adjacent X-Y buses which interconnect the display elements upon the panel and permit peripheral connection to drive and control circuitry. The thin film transistor control circuit which has been found particularly useful two transistors and a storage capacitor connected between the respective X-Y buses which define or relate to a specific unit cell. The information signal is stored on the storage capacitor and used to control the voltage which appears across the electrode pad and a light transmissive cover electrode which covers the entire display panel. The layout of the thin film transistors, the storage capacitor and the display medium electrode pad is such that it is virtually impossible to center the display medium electrode pad within a unit cell layout. Thus, when one fabricates a display module with the display medium electrode offset from the unit cell symmetry, it is not possible to abut the identical modules to form the entire display panel, and to at the same time align the display elements in both type X and Y directions, so that the entire abutted display panel has symmetrically disposed display elements.

SUMMARY OF THE INVENTION

An information display panel and method of fabrication is described in which at least two identical edge abutted display modules are joined together to form the display panel. Each of the display modules comprises a substrate upon which are disposed an X-Y array of display elements with thin film control circuits disposed upon the substrate connected individually to respective display elements. Rows and columns of X-Y thin film conductive buses are also disposed on the substrate extending between and interconnecting the display elements of the respective modules.

The display panel is fabricated by forming identical modules with the display medium driving electrode pad center of symmetry at the center of symmetry of the module. In this way when the modules are abutted together to form the display panel of the electrode pads are symmetrical relative to each other and to the center of symmetry of the display panel.

DESCRIPTION OF THE PREFERRED EMBODIMENTS

Figure 1:
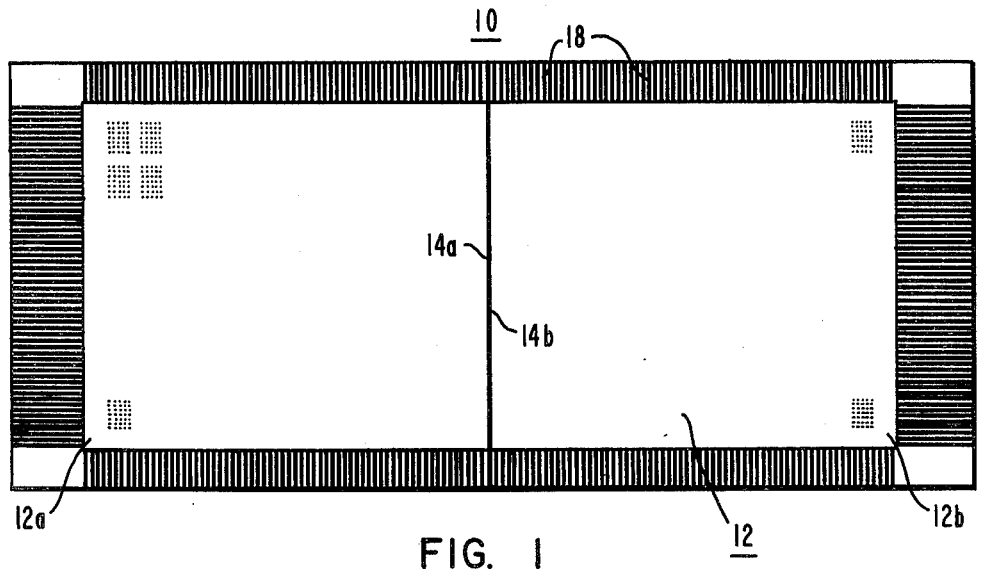
FIG. 1 is a plan view of the alphanumeric display panel of the present invention with a highlighted enlarged area shown along the line of abutment between the modules which form the display panel.

An alphanumeric display panel embodiment of the present invention is seen in detail in FIG. 1. The display panel 10 comprises two edge abutted modules 12. As will be described later in greater detail, each module 12 is identical and comprises a thin insulating substrate with at least one highly polished straight edge peripheral side 14, which forms the edge along which the panels are abutted and aligned. The 5×47 7 dot matrix alphanumeric format is seen in FIG. 1, and this format extends over substantially the entire panel area. The light emitting electrode areas are aligned along the horizontal direction across the abutted edges of the modules. The modules are typically formed of a glass substrate 16 and a plurality of conductive edge contacts 18 are disposed on three sides of the module, that is, on the three sides of the module other than the straight edge side 14. The straight edge side 14 is polished to about a 0.2 mil tolerance which permits simplified alignment and abutment with the panels during fabrication.

Figure 2:
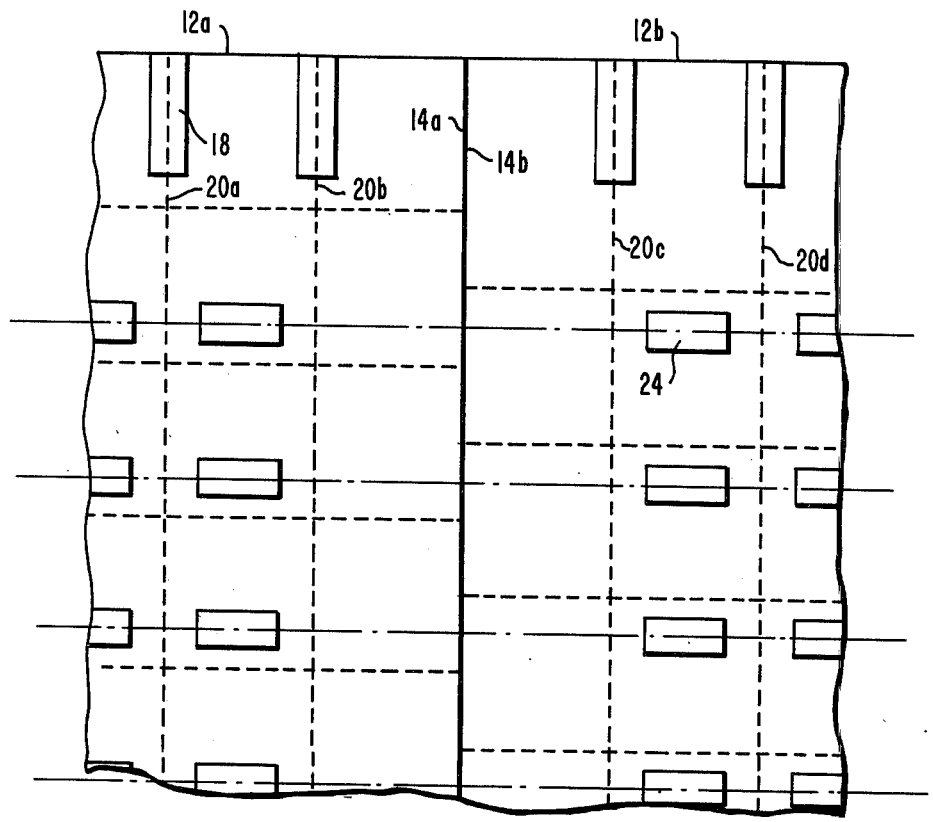
FIG. 2 is a further enlargement along the abutment line between the modules which helps to illustrate in a schematic fashion the alignment of the display elements.

In the enlarged partial panel view seen in FIG. 2 the conductive edge contacts 18 are connected to the vertically oriented conductive buses 20a, 20b, 20c, and 20d. The vertically oriented Y rows of conductive buses 20a, 20b, 20c, 20d intersect with, but are insulated from the horizontally disposed X conductive buses 22a, 22b, 22c, 22d. A unit display cell is defined between adjacent X and Y buses. It can readily be seen that the horizontally disposed X conductive buses are not continued from one panel to the other but are rather offset and not aligned. A rectangular display medium electrode pad 24 is schematically seen positioned non-symmetrically within a unit cell as will be explained in detail later relative to the fabrication technique when the modules are arranged in abutted fashion along the straight edges 14. The display medium electrode pads 24 are aligned in both the horizontal and vertical direction over the entire display panel.

Figure 3:
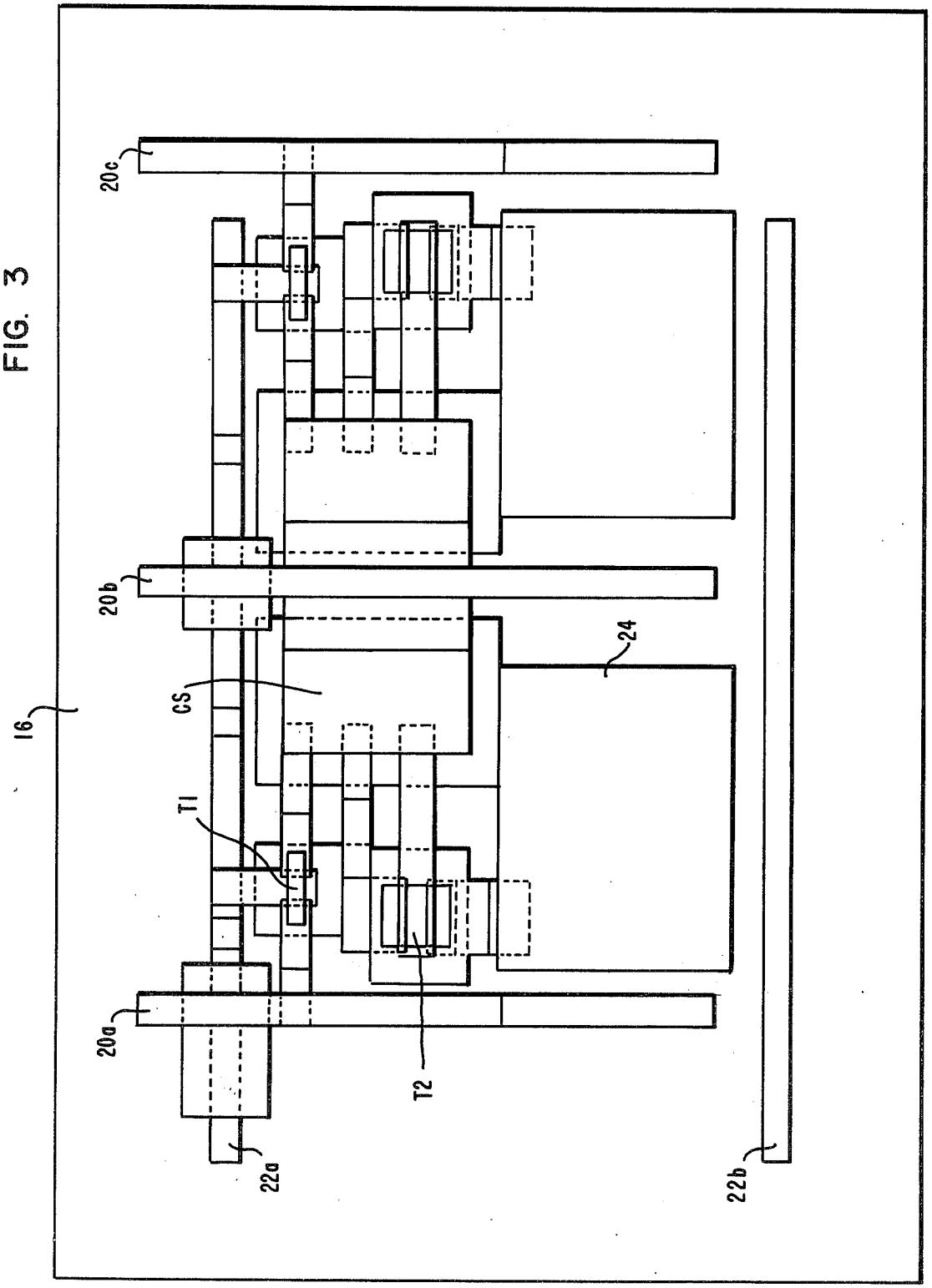
FIG. 3 is an enlarged plan view of the thin film transistor circuitry layout for two adjacent display elements.

In the more enlarged circuit layout view of FIG. 3, the vertically oriented Y conductive buses 20a, 20b and 20c are seen and the horizontally directed X conductive buses 22a and 22b are shown. In this view two such unit display elements are seen side by side. It can be readily appreciated that the electrode pad 24 is offset from the center of symmetry of the display element unit cell. The thin film circuit elements seen in this layout include a transistor T1, the gate of which is connected to the X bus 22a, and one contact of T1 is connected to Y bus 20a. The other contact of transistor T1 is connected to the signal storage capacitor CS, while one contact of transistor T2 is connected to the display element electrode pad 24. The display element is typically an electroluminescent phosphor which is disposed over the entire area of the display panel after the various thin film circuit elements have been deposited and covered by a suitable insulating layer except for the electrode pad area 24 which the phosphor contacts. A light transmissive top cover electrode, not shown, is disposed over the phosphor layer, and the potential across the electrode pad 24 and the light transmissive top cover electrode drives the electroluminescent phosphor to produce a light output for the individual display element of dot matrix picture point.

Figure 4:
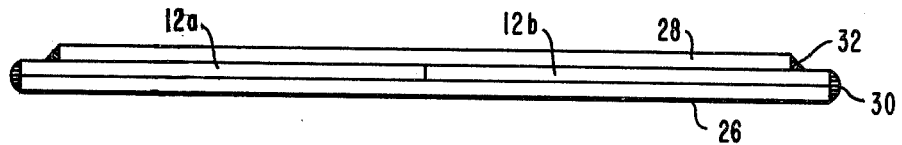
FIG. 4 is a side elevational view of a partially assembled display panel in which the modules are mounted upon a backing plate and have a cover glass layer disposed over the abutted modules with the peripheral edges being hermetically sealed.

A partly assembled display panel assembly is seen in FIG. 4 wherein the abutted modules 12a and 12b form the panel with the modules disposed upon a backing plate 26. The backing plate 26 is of the same area and size as the combined modules. A frit or other hermetic seal 30 is provided around the peripheral edges of the modules sealing them to the backing plate. A light transmissive plate of glass 28 is disposed over the abutted modules with the area of the cover plate 28 being less than the area of the abutted modules so that the edge contacts 18 extend beyond the cover glass on each peripheral edge. The cover glass 28 is likewise sealed to provide a hermetic seal 32 between the module substrate glass and the top cover glass 28, so that the thin film transistorized circuitry is undisturbed by ambient conditions.

Figure 5:
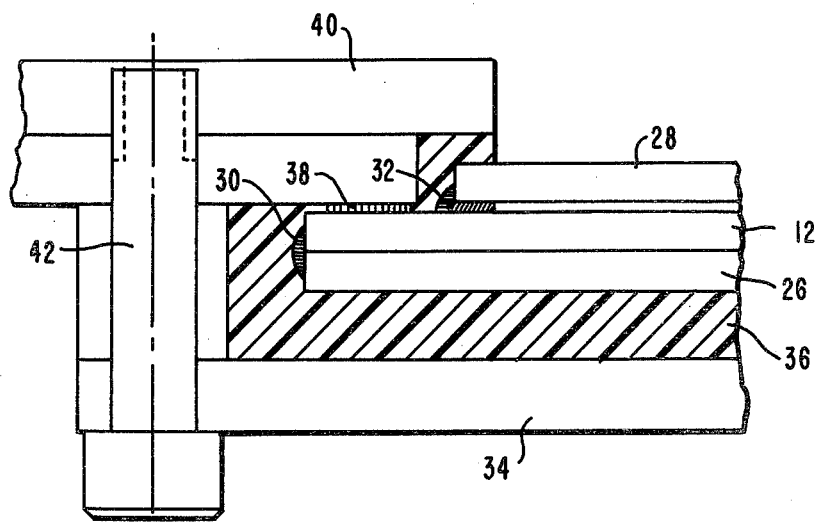
FIG. 5 is a partial side elevational view partly in section of an assembled and mounted display panel.

The finalized display panel assembly is seen in greater detail in FIG. 5. The hermetically sealed intermediate display panel assembly seen in FIG. 4 is then supported within a rugged shock-resistant support structure. The support structure comprises a metal or other rigid base plate 34 which is the main supporting structure with the display assembly mounted on the base plate with silicone rubber shock-resistant material disposed between the base plate and the display assembly. Compressible elastomer contacts 38 are provided for making electrical contact with the edge contacts 18 on the periphery of the display assembly. These elastomer contacts are held in compressive engagement with the edge contacts by the outer frame member 40 which is engaged by the bolts 42 which compress the outer frame to the aluminum plate. A silicone rubber layer is provided between the outer frame and the top cover glass to again support the display assembly in a floating manner between the outer frame and the aluminum base plate.

The first step in fabricating the display panel is to provide the individual glass substrate modules with the desired straight edge polished to a 0.2 mil tolerance which is to be the edge abutting straight edge side 14. The thin film transistor circuit components are vacuum deposited upon the glass substrate through a mask set which is optically aligned using a vernier scale microscope to the critical module straight edge side 14 with the center of symmetry of the electrode pad 24 being made symmetrical with respect to the module substrate center of symmetry. Alignment of the mask set to provide the electrode pad center of symmetry aligned with the module center of symmetry permits each identical module when fabricated to be joined with another module by flipping one module in 180° rotation to form the abutted module to complete the display panel. This module abutment during final assembly is automatically achieved using the straight edge 14. A convenient fabrication technique has been to assemble and abut the modules 12 upon the backing plate 26 via a vacuum hold-down system using a double sided adhesive tape between the modules 12 and the backing plate 26. The electrode pads in this way line up through about a 0.2 mil tolerance across the module border. The backing plate 26 need not be light transmissive and can be metal or glass, and is covered with the double sided adhesive tape. Polyester or polyimide TEMP-R-TATE, a registered trademark material of the 3M Company, has been found very effective in this assembly process. It has been found desirable to first make an epoxy seal between the top cover plate 28 and the abutted modules when making the display assembly. Thereafter a frit or other hermetic seal is provided between the top cover glass and the substrate glass at the peripheral edge. The display assembly package with the silicone rubber layers between the back plate and the display assembly and the outer frame contain no voids where compressible or expandable air can be found. The completed display assembly is therefore usable at high altitude and has high stability in high humidity.

The above described display panel embodiment is designed specifically for alphanumeric information display with groupings of 5×7 individual unit cell and electrode pads, separated by 2 unit spaces in the horizontal direction and 3 unit spaces in the vertical direction. It should be understood that the display panel structure and method of fabrication are applicable for more generalized graphic or even video displays where the display elements cover the entire panel without spacing or grouping as per the alphanumeric embodiment. It is still essential to form horizontally and vertically aligned lines of display elements, i.e. electrode pads.

The invention has also been described with respect to assembling two modules to form the display panel but is not so limited. Larger panels can be formed using the present invention, and can be facilitated with more than one accurate straight edge side being provided on the module substrate periphery.

We claim:

1. An information display panel which comprises at least two edge abutted display modules each of which comprise a substrate upon which are disposed an X-Y array of display elements with thin film control circuits disposed upon the substrate connected individually to respective display elements each of which elements include a display medium electrode pad which is non-symmetrically disposed within the electrode pad center of symmetry is symmetrical with respect to the module center of symmetry, and X-Y thin film conductive buses disposed on the substrate extending between and interconnecting the display elements of the respective modules, which X-Y conductive buses are connectable at the panel periphery to drive circuitry for addressing and controlling the display elements, wherein the modules are abutted together such that the X-Y buses of the modules are offset so as to be separated at the abutted edge, while the display medium electrode pads of the X-Y display element arrays on each module are symmetrically aligned.

2. The display panel specified in claim 1, wherein the X-Y array of display elements comprises spaced apart rectangular groupings of display elements, with each rectangular grouping addressable to display an alphanumeric character.

3. The display panel specified in claim 1, wherein the peripheral lead-in connections to the X-Y conductive buses for each module are separate for each module.

4. The display panel specified in claim 1 wherein the display elements and the thin film control circuits and the X-Y conductive buses are all disposed on one active side of the module substrates and edge abutted modules are mounted on a unitary support plate, with a sheet of material having adhesive on both sides of the sheet disposed between the unitary support plate and the other non-active sides of the module substrates.

5. The display panel specified in claim 1, wherein the display medium of each display element is an electroluminescent phosphor.

6. The display panel specified in claim 5, wherein the electroluminescent phosphor is provided as a continuous layer over the entire active side of the modules, with insulating layers provided over and covering the thin film control circuitry so that only an electrode pad is in contact with the (EL) electroluminescent phosphor layer, and wherein a light transmissive faceplate is provided over the (EL) electroluminesecent phosphor layer, with a light transmissive continuous electrode film on the faceplate side in contact with the (EL) electroluminescent phosphor layer, with hermetic peripheral seals provided between the modules and the unitary support plate, and between the modules and the faceplate.

7. The display panel specified in claim 6, wherein in the hermetic peripheral seal is provided by a frit glass sealed to the peripheral edges of glass substrates.

8. A method of manufacturing a display panel comprised of a plurality of edge abutted identical display modules wherein a plurality of discrete display elements are disposed as an X-Y array on each module, which display elements comprise thin film transistor control circuitry with X-Y insulated buses interconnecting the display elements, and wherein a display medium actuating thin film electrode pad is non-symmetrically disposed as an element of each display element layout, but when the modules are abutted to form the display panel the electrode pads are symmetrical relative to each other which method comprises:
(a) fabricating each module with the electrode pad center of symmetry symmetrical with respect to the center of symmetry of the module;
(b) abutting at least one predetermined edge of the modules together to form the display panel wherein the electrode pads are symmetrical relative to each other.

9. The method specified in claim 8, wherein at least one edge of the module is a highly polished straight edge, with this straight edge of the modules abutted together to form the panel, and wherein in fabricating the modules with the electrode pad center of symmetry symmetrical with respect to the center of symmetry of the module this is carried out by optically aligning an evaporation mask set for the display element through which the electrode pad is evaporated and offsetting the mask set from the center of symmetry of the glass module, so as to align the center of symmetry of the electrode pad portion of the mask set to be symmetrical with the module center of symmetry.

* * * * *